United States Patent
Allen et al.

(10) Patent No.: US 6,468,396 B2
(45) Date of Patent: Oct. 22, 2002

(54) DENDRIMERIC POLYMERS FOR THE PRODUCTION OF PAPER AND BOARD

(75) Inventors: Lawrence Harvey Allen, Pointe Claire (CA); Marco Savio Polverari, Montreal (CA)

(73) Assignee: Pulp and Paper Research Institute of Canada, Point-Claire (CA)

( * ) Notice: Subject to any disclaimer, the term of this patent is extended or adjusted under 35 U.S.C. 154(b) by 0 days.

(21) Appl. No.: 09/825,101

(22) Filed: Apr. 4, 2001

(65) Prior Publication Data

US 2001/0018957 A1 Sep. 6, 2001

Related U.S. Application Data

(63) Continuation of application No. 09/448,609, filed on Nov. 24, 1999, now abandoned, which is a continuation-in-part of application No. PCT/CA98/00504, filed on May 22, 1998.
(60) Provisional application No. 60/048,558, filed on Jun. 4, 1997.

(51) Int. Cl.⁷ .................... D21H 13/00; D21H 15/00; D21H 17/00
(52) U.S. Cl. ............... 162/168.1; 162/168.2; 162/168.3; 162/164.6; 162/158; 528/332; 525/451; 260/42.51; 260/6; 260/29.6; 260/823
(58) Field of Search ................ 162/168.3, 168.1, 162/164.6, 158, 168.2; 528/332, 310; 525/451; 260/42.51, 6, 29.6, 823, 874, 2 R, 879

(56) References Cited

U.S. PATENT DOCUMENTS 4,507,466 A * 3/1985 Tomalia et al. ............. 528/332
4,798,653 A * 1/1989 Rushmore ................ 162/168.3

* cited by examiner

*Primary Examiner*—Steven P. Griffin
*Assistant Examiner*—Mark Halpern
(74) *Attorney, Agent, or Firm*—Ogilvy Renault

(57) ABSTRACT

A papermaking stock and a method for improving the retention of pulp fines, mineral fillers, dispersed wood resin, and/or synthetic hydrophobic stickies and cellulose fibers in a cellulosic fiber sheet, employs dendrimeric polymers for increasing the retention of fines, fillers, dispersed hydrophobic particles, and cellulosic fibers. The application in the paper industry provides a means of (1) increasing the retention of fillers in paper and decreasing the loss of filler materials in white water waste from papermaking; (2) increasing the retention of cellulosic fines and fibers in the paper-making process; increasing drainage on the paper machine; and (3) removing a significant fraction of the wood resin, plastics, and stickies from the process stream thus enabling a greater extent of reuse of filtrates and, hence, less effluents from mills, fewer problems from wood resins such as deposit formation, loss of strength of product, and contamination of product with dirt particles.

30 Claims, 2 Drawing Sheets

DENDRIMERIC POLYMERS FOR THE PRODUCTION OF PAPER AND BOARD

CROSS REFERENCE TO RELATED APPLICATION

This Application is a Continuation of U.S. Ser. No. 09/448,609, filed Nov. 24, 1999, now abandoned, which is a Continuation-in-Part of PCT/CA98/00504, filed May 22, 1998, and published Dec. 10, 1998 as International Publication No. WO98/55693, in which the United States of America was designated and elected, and which remains pending in the International phase until Dec. 4, 1999, which in turn claims priority from U.S. application Ser. No. 60/048,558, filed Jun. 4, 1997, and the benefit of 35 U.S.C. 119(e).

TECHNICAL FIELD

The present invention is in the technical field of papermaking, and, more particularly, in the technical field of wet-end additives to the papermaking stock or furnish. In particular the invention relates to a papermaking stock, a method for increasing or enhancing the retention of components of a papermaking stock during the manufacture of paper, and a method of producing paper. In an especially important embodiment the methods are carried out in relatively "closed" mill water systems while simultaneously increasing drainage and decreasing the amount of deposits from colloidal hydrophobic particles often referred to as "stickies" or "pitch" on the paper machine.

BACKGROUND ART

The manufacture of paper is a complex process which can be broken down into a series of less involved processes. One of the more important processes occurs at the paper machine. At this location, an aqueous cellulosic suspension, stock, furnish or slurry is formed into a paper sheet. The cellulosic suspension is made by providing a thick stock, diluting the thick stock to form a thin stock, draining the thin stock on a forming fabric to form a sheet, and drying the sheet.

The cellulosic slurry is generally diluted to a known consistency (based on percent dry weight of solids in the slurry) of less than 2 percent. Ideally, the consistency is between 0.8 and 1.5 percent.

The cellulosic slurry is generally, but not necessarily, a mixture of chemical, mechanical and secondary (e.g., deinked) pulps. For example, this includes all paper and board furnishes based on mechanical pulp and, in part, semi-bleached kraft pulp, unbleached kraft pulp, and/or unbleached sulfite pulp. The mechanical pulps may be stone-groundwood, pressure groundwood, thermomechanical pulp, or semi-chemical mechanical pulp. Other pulps may include deinked pulps, reslushed newsprint or any secondary fiber source.

Cellulosic slurries of high quality pulps can also be used to produce fine paper grades (e.g., photocopying paper), tissue or toweling sheets. These slurries include highly bleached mechanical or chemical pulps.

It is common to include various inorganic materials, such as bentonite and alum, and/or organic materials, such as various natural, modified natural, or synthetic polymers in the thin or thick stock for the purpose of improving the drainage and retention processes.

Such materials can be added for diverse purposes such as, for example, pitch control, increased drainage and retention, improved formation, increased wet and dry strength, defoaming, facilitation of release from drying rolls, and decolorization of effluents.

In addition, many grades of paper include substantial levels of inorganic fillers such as, for example, kaolinite, calcium carbonate, and titanium dioxide. The percentage of mineral filler added to a papermaking slurry may vary between 0 and 35% by weight of dry paper depending on the type of sheet being formed.

In the papermaking process, much of the pulp is separated from the fibers, fillers, and pigments by filtration. The filtrate, which is called the white water, contains a large amount of unretained colloidal particles which may be fibre fragments, mineral fillers, deinking plant materials, or pigment particles. The poor retention of these is a consequence of the difficulty in the filtration of material characterized by colloidal or nearly colloidal dimensions. Poor fines retention is a serious problem because it results in the loss of valuable cellulosic material and the additional loading of water treatment facilities.

The least expensive and oldest dewatering method is simple gravity drainage. More expensive methods which are also used include vacuum, pressing, and evaporation. Drainage may be accomplished either horizontally or vertically, by one side of the forming sheet only or by both sides.

In practice, a combination of such methods is employed to dewater or dry the sheet to the desired water content. Since drainage is the first dewatering method and the least expensive, improvement in the efficiency of drainage will decrease the amount of water required to be removed by other more costly methods such as drying. This will improve the overall efficiency of the process.

The papermaking fibers employed in papermaking are often of low grade and are predominantly of the mechanical type and include groundwood, thermomechanical pulp, deinked secondary fibers, semi-chemical pulps, and semi-bleached chemical kraft pulps. The cellulosic fibers thus produced are rarely very "clean" and are rarely completely separated from the residual process liquors which contain substantial levels of both organic and inorganic impurities. These impurities are derived from the pulping process and by-products which are naturally present in wood (Linhart F., Auhorn W. J., Degen H. J. and Lorz R., Tappi J. 70(10) 79–85 (1987), Sunberg K., Thornton J., Pettersson C., Holmbom B., and Ekman R., J. Pulp Paper Sci., 20(11), J317–321 (1994)). These are often referred to as detrimental substances because they interfere with the function of many additives.

Detrimental substances increase the cationic demand of the pulp slurry. The cationic demand is the number of equivalents of cationic charge that has to be added to the slurry to neutralize the excess anionic charge of the pulp slurry. The cationic demand is usually met using a low molecular weight (<500 000) highly charged synthetic cationic polyelectrolyte. These polymers are, for example, the following: polyethyleneimines, polyamines having a molecular weight of more than 50,000, polyamidoamines modified by grafting onto ethyleneimine, polyamidoamines, polyetheramines, polyvinylamines, modified polyvinylamines, polyalkylamines, polyvinylimidoazoles, polydiallydialkyl ammonium halides, in particular polydiallyldimethylammonium chloride. These polyelectrolytes are soluble in water and are used in the form of aqueous solutions.

The cationic demand of pulps used for making, for instance, newsprint is often above 1000 meq./mL of stock so that improvements only become significant with polymer weights of above 1000 grams dry polymer per tonne dry weight of paper. Such large amounts render treatment uneconomical.

Impurities in papermaking furnishes which need to be neutralized by the cationic polymer are present in solution as dispersed colloidal particles, and/or dissolved substances such as lignosulfonates and sulfites, kraft lignin, hemicelluloses, lignans, humic acids, dispersed wood resins, rosin acids and chemical by-products. These impurities impart a large negative charge on the surfaces of cellulose fibers and other materials when they are dispersed in water.

Recently, due to environmental legislation, the level of the aforementioned impurities in papermachine white-water systems has further increased. This increase is a consequence of the increased tendency for paper mill operations to "close up" the paper machine white water systems and recycle as much white water as much as possible.

A second problem often associated with the manufacture of paper is the accumulation of wood resin and synthetic hydrophobic materials on the surfaces of the process equipment. Wood resin is usually defined as the material in wood which is insoluble in water, but soluble in organic solvents (Mutton, D. B., "Wood Extractive and Their Significance to the Pulp and Paper Industries" Chap. 10, Wood Resins, Ed. W. E. Hills, Academic Press, New York (1962)). The weight of wood resin from all species of trees consists usually of 1–5% based on total weight. From the teachings of U.S. Pat. No. 5,468,396 it is seen that increased reuse of mill white water causes a build-up in the concentration of water-borne resins (Allen L. H. and Maine C. J., Pulp Paper Can., 79(4): pp. 83–90 (1978)) and exacerbates the tendency for pitch deposition (Allen L. H., Tappi J., 63(2), pp. 82–87, (1980)). Many chemicals used to combat foam in pulp and paper mills end up dispersed in the aqueous phase of a pulp suspension and co-deposit with wood resin (Dorris G. M., Douek M., and Allen L. H., J. Pulp Paper Sci., 11(5): J149–154 (1985); Dunlop-Jones N. and Allen L. H., J. Pulp Paper Sci., 15(6): J235–241 (1989)). The presence of high amounts of dissolved and dispersed resin in paper machine process liquids usually also leads to reduced paper strength and runnability (Wearing, J. T., Ouchi, M. D., Mortimer, R. D., Kovacs, T. G., and Wong, A., J. Pulp Paper Sci., 10(6): J178 (1984)). Synthetic hydrophobic materials are usually introduced via deinked pulps and have similar chemical and physical properties to wood resins.

U.S. Pat. No. 5,468,396 teaches the use of a centrifugal deresination of the pulp and paper process liquids as an economical method to remove detrimental colloidal pitch. Furthermore U.S. Pat. Nos. 5,468,396 and 4,313,790 teach further prior art for reducing the concentrations of dissolved and dispersed resin which include the use of alum, dispersants, talc (Allen L. H., Tappi J., 63(2): pp. 82–87 (1980)); Douek M. and Allen L. H., J. Pulp Paper Sci., 17(5): J171–177 (1991)), sequestrants and a number of non-chemical methods such as bleeding the system, discarding of wash water, the use of a Frotapulper, followed by caustic extraction, as described by MoDo, and saveall flotation. Most of these methods are either too expensive under most circumstances or the practice is no longer tolerated.

In light of the aforementioned discussions, there has been ongoing extensive research into the development of new retention aids which increase retention and improve drainage in closed, highly contaminated systems. Traditional retention aids have had only a limited success in accomplishing these goals.

Increased retention and drainage allow significant economic benefits for a mill. Increased retention allows for cost savings in terms of reduced fibre consumption, cleaner machine operations, and decreased cost of effluent treatment. Increased drainage allows increased savings in terms of lower steam consumption brought about by a dryer sheet at the drying section.

In U.S. Pat. No. 4,313,790, inventors Pelton, Allen and Nugent have shown that a combination of kraft lignin or modified kraft lignin and poly(ethylene oxide) effectively increases fines retention and decreases pitch deposition on a papermaking machine in a papermaking process. A possible drawback to this system is the fact that mineral filler retention is not very high.

One method extensively used in the industry to improve the retention of cellulosic fines, mineral fillers, and other furnish components on the fiber mat is the use of a coagulant/flocculant dual polymer program system. The coagulant and flocculant are added ahead of the paper machine. In such a system a low molecular weight (usually <500, 000), highly charged polyelectrolyte coagulant or cationically modified starch is added first to the furnish. This has the effect of reducing the cationic demand of the furnish and reducing the negative surface charges present on the particles in the furnish. This initial addition of the coagulant accomplishes an initial degree of agglomeration and also tends to fixate mineral fillers and colloidal pitch/stickies to the fibers. The addition of the coagulant is then followed by the addition of the flocculant. Such flocculant is generally, but not necessarily, a high molecular weight anionic, cationic, or neutral synthetic polymer which bridges the particles or agglomerates. Such a combination increases drainage and retention.

Another system employed to provide an improved combination of retention and drainage is described in Canadian Patents 1,168,404 and 1,255,856 by inventors Langeley and Litchfield. The above patents describe the addition of bentonite prior to a high shear point followed by the addition of a cationic or anionic polymer after the shear point. The initial addition of bentonite is thought to absorb the detrimental substances present in solution. The shearing generally is provided by one or more stages of the papermaking process such as the centriscreening. At these shear points the shearing breaks down the large flocs formed prior to the shear point. This system is sold under the tradename Organosorb/Organopol.

Canadian Patents 1,322, 435 and 1,259,153 call for the addition of low molecular weight synthetic polyelectrolyte and/or high molecular weight cationic flocculant prior to a shear point followed by the addition of bentonite after the shear point. This system is often referred to as the Hydrocol system.

U.S. Pat. No. 4,749,444 by Lorz, Auhom, Linhart, and Matz teaches the addition of bentonite to a thick stock followed by the addition of a coagulant to the thin stock prior to a shear point and the subsequent addition of a high molecular weight cationic or anionic flocculant after the shear point.

The system described in U.S. Pat. No. 4,388,150 teaches the combination of cationic starch followed by colloidal silica to increase the amount of material retained in the sheet. Yet another variation of the system is described in U.S. Pat. Nos. 4,643,801 and 4,795,531 which use, in addition to starch, synthetic polymers.

Additional systems to improve drainage and retention have also been proposed. South African Patent 2 389/90 corresponding to U.S. Ser. No. 397,224 teaches the use of a single, high molecular weight cationic polymer.

U.S. Pat. No. 5,089,520 suggests a drainage and retention program in which a cellulose papermaking slurry is treated with a high molecular weight cationic (meth)acrylamide polymer prior to at least one shear stage followed by the addition of a low molecular weight anionic polymer at least one shear stage subsequent to the addition of the cationic polymer.

U.S. Pat. No. 5,266,164 by Novak and Fallon provides a method for improving the retention of mineral fillers and cellulose fibers on cellulose fiber sheet. This is accomplished by the addition of an effective amount of high molecular weight cationic polymer prior to a shear point followed by the addition of a high molecular weight anionic flocculant after the shear point. The difficulty with the use of the aforementioned chemistries in "closed" mill systems is their loss of effectiveness as retention and drainage aids (Allen, L. H., Polverari, M., Levesque B., and Francis D. U., 1998 Tappi, Coating/Papermakers Conference, New Orleans, Book 1, pp. 497–513 (1998)). A further difficulty with retention aids is that some polymer chemistries work better in some mills and worse in others.

WO 95/03450 teaches the use of cationic multi armed star-like polymers (hereinafter referred to as CMA-PAM) as an effective component to improve the retention of fines fraction by structural characteristics of multi armed polymer chains connected with one starting point on the compound. The CMA-PAM were synthesized by using pentaerythritol triacrylate (PETA) as the starting point. The three acrylate bonds are then reacted with the monomers acrylamide (AM) and dimethylamino-ethylacrylate (DMAEA-MC). Ammonium persulfate (APS) was used as the initiator. The structure formed is said to be star-like because the linear DMAEA-MC-AM chains extend from the central starting point, PETA. Depending on the DMAEA-MC-AM ratios the viscosity of the CMA-PAM vary between 86 and 450 centipoise (cP) and the charge densities do not exceed 1.5 meq./g at pH=7. The star-like structure was found to be more resistant to shear than linear PAM.

WO 95/03450 is thus concerned with polyols as starting compound; linear AM and DMAEA-MC chains are "attached" to the polyol OH groups. The maximum number of branches from the center is 4; these are not dendrimers. Dendrimers, while also starting from a central point, continue to "branch out" with every subsequent reaction.

Agents are also added to some papers, during fabrication to improve the wet strength of the product paper; wet strength agents are generally required for requiring wet strength papers such as tissue and towel, but are not required for printing papers. The function of a wet strength agent is different from the function of agents for enhancing retention of papermaking stock components and of agents for increasing drainage and there is no correlation between these different agents employed for different functions in papermaking.

Thus melamine formaldehyde and urea formaldehyde are among the most commonly employed wet strength agents in paper manufacture but have no utility as retention aids.

DISCLOSURE OF THE INVENTION

It is an object of this invention to provide a method of enhancing retention of components of a papermaking stock in a cellulosic sheet formed from the stock.

It is a particular object of this invention to provide a method of producing paper employing a dendrimeric polymer to enhance retention of components of a papermaking stock in the paper formed from the stock.

It is still another object of the invention to provide a papermaking stock containing a dendrimeric polymer to enhance retention of papermaking components of the stock in a cellulosic sheet formed from the stock.

In accordance with one aspect of the invention there is provided a papermaking stock comprising: an aqueous paper-forming cellulosic dispersion of papermaking components comprising cellulosic papermaking fibers and papermaking additives in an aqueous vehicle, characterized in that said dispersion contains a dendrimeric polymer as an agent to enhance retention of said components in a cellulosic sheet formed from said dispersion in papermaking, and in an amount to effect such enhanced retention and provide a cellulosic sheet having an enhanced content of the papermaking components as compared with a cellulosic sheet from a corresponding aqueous paper-forming cellulosic dispersion of papermaking components free of said dendrimeric polymer, said dendrimeric polymer being capable of developing a positive charge at an operating pH of papermaking.

In accordance with another aspect of the invention there is provided a method of enhancing retention of components of a papermaking stock in a cellulosic sheet formed from said stock in papermaking, said stock comprising an aqueous paper-forming cellulosic dispersion of papermaking fibers and papermaking additives in an aqueous vehicle, characterized by the inclusion in said dispersion of a dendrimeric polymer being capable of developing a positive charge at an operating pH of papermaking in an amount to enhance retention of said components in the cellulosic sheet.

In accordance with still another aspect of the invention there is provided a method of producing paper comprising forming a cellulosic sheet from a papermaking stock comprising an aqueous paper-forming cellulosic dispersion of papermaking components comprising papermaking fibers and papermaking additives in an aqueous vehicle characterized by enhancing retention of said components in the cellulosic sheet by the enhancing method of the invention, recovering a cellulosic sheet from the stock having an enhanced content of the papermaking components as compared with a cellulosic sheet formed from a corresponding aqueous paper-forming cellulosic dispersion of papermaking components free of the dendrimeric polymer, and recovering an aqueous fraction of the stock having a diminished content of the papermaking components.

Still further the invention provides paper produced by the aforementioned process of the invention.

In still another aspect of the invention there is provided a cellulosic paper sheet derived from an aqueous paper-forming cellulosic dispersion of papermaking components and a dendrimeric polymer capable of developing a positive charge at an operating pH of papermaking, said paper sheet containing said dendrimeric polymer and having an elevated content of the papermaking components of the dispersion, as compared with a paper sheet derived from a corresponding dispersion free of said dendrimeric polymer.

In accordance with yet another aspect of the invention there is provided use of a dendrimeric polymer to enhance retention of components of a papermaking stock in a cellulosic sheet formed from the stock, said polymer being capable of developing a positive charge at an operating pH of papermaking.

Thus a process has been discovered for the increase or enhancement of fines and filler retention and a decrease of pitch and/or stickies deposition during the manufacture of paper or paperboard, which involves the addition to the papermaking suspension of a dendrimeric polymer typically as a polymer solution. This system has also shown itself to be effective in "closed" mill systems.

Alternatively, the dendrimeric polymer may be added to the diluted filler slurry, prior to addition of the filler slurry to the paper stock, when producing filled grades or to the undiluted thick stocks, prior to dilution.

When the present invention is practiced, the retention of fines and filler is increased which in turn results in decreased fines in the white water which, in turn, facilitates a lower head box consistency, a higher headbox freeness, and a more even distribution of fines and filler in the cellulosic sheet. In addition, practise of this invention fixes dispersed wood resin and stickies in the cellulosic sheet and results in a decrease in problems due to pitch deposition on the paper machine.

Other benefits from the practice of this invention include increased drainage, increased white water reuse, increased closure, lower energy consumption, and increased fines retention.

DESCRIPTION OF PREFERRED EMBODIMENTS

Using this invention it is possible to make any grade of paper, for example newsprint, board, and the so-called groundwood specialty grades. Tissue, toweling, and other fine papers can also be produced by practising the invention.

Papers and paperboards may be produced using, as the principle raw material groundwood (GWD), thermomechanical pulp (TMP), chemithermomechanical pulp (CTMP), pressurized groundwood (PGW), bleached kraft (BK), semi-bleached kraft (SBK), unbleached kraft (UBK), sulfite or sulfate pulps. Other suitable pulps such as deinked (DIP) and refiner mechanical pulp (RMP) may also be used. Each of these pulps may contain short or long fibers.

It is also possible to produce both filler free and filler containing papers. The maximum filler content of the paper is typically 40%, by weight, based on oven dried fiber but is generally 0 to 35%, by weight, and preferably between 5 to 15%, by weight. Examples of suitable fillers are clay, kaolin, chalk, talc, precipitated calcium carbonate (PCC), ground calcium carbonate (GCC), titanium dioxide, calcium sulfate, barium sulfate, alumina, satin white, organically synthesized fillers, or mixtures thereof.

A wet strength agent, for example, a melamine formaldehyde or a urea formaldehyde may be added to the papermaking stock, in addition to the dendrimeric polymer of the invention, especially in the case of papers requiring wet strength papers such as tissue and towel.

In most cases, however, especially in printing papers, no wet strength agent is required and the dendrimeric polymer is added to the papermaking stock without the addition of a wet strength agent.

In particular, the papermaking stock may be free of wet strength agents.

The dendrimeric polymer enhances retention of papermaking components in a cellulosic sheet formed from a cellulosic dispersion of papermaking components and produces a cellulosic sheet having an enhanced content of the papermaking components as compared with a cellulosic sheet formed from a second cellulosic dispersion which differs only in that it is free of the dendrimeric polymer.

On the other hand, an aqueous fraction of the papermaking stock of the invention separated from the cellulosic sheet formed from the stock, has a diminished content of papermaking components, as compared with an aqueous fraction separated from the aforementioned second cellulosic dispersion free of the dendrimeric polymer.

The term dendrimeric macromolecules is understood as embracing very generally highly branched macromolecules that emanate from a central core and are synthesized through a stepwise, repetitive reaction sequence. Dendrimeric macromolecules are often referred to as "starburst" polymers. Dendrimers are a new class of macromolecules with a hyperbranched structure. This structure is well defined in terms of chemical composition and three-dimensional configuration. Dendrimers are synthesized in a stepwise manner, which provides unique control over chemical and physical properties. This control allows for the development of products which are tailored to specific applications. For example the end groups of the dendrimers are very well accessible for all kinds of modification reactions. Examples of modified end groups include carboxylic or fatty acid derivatives (Tomalia, D. A., Naylor, A. M., and Goddard, W. A., Angew. Chem. Intl. Ed. Engl., 29, 138–175 (1990); Frechet J. M., Science, 263, 1710–1715 (1994)).

Due to the repetitive reaction sequence in the synthetic procedure, dendrimers can be obtained with a chosen number of generations and end-groups. These structures are well defined in terms of both chemical composition and three dimensional configuration. Since dendrimers are synthesized in stages, one is afforded unique control over their chemical and physical properties such as size, shape, reactivity, solubility, and three dimensionality. This control allows the development of products which are tailored to specific applications. Reference is made to the following literature citing the synthesis of dendrimers: (Newkome G. R. et al., Macromolecules, 26(9), 2394–2396 (1993); Jansen et al., Science, 266, 1226–1229 (1994); Frechet, J. M., Science, 263, 1710–1715 (1994); Tomalia, D. A., Naylor, A. M., and Goddard, W. A., Angew. Chem. Intl. Ed. Engl., 29, 138–175 (1990); Biswas P. And Cherayil B. J., J. Chem. Phys., 100(4), 3201–3209 (1994); Kim Y. and Beckerbauer R., Macromolecules, 27, 1968–1971 (1994); Mourey T. et al., Macromolecules, 25, 2401–2406 (1992); Kremers J. A. and Meijer E. W., J. Org. Chem., 59(15), 4262–4266 (1994); van Genderen M. H. P. et al., Rec. T. Chimiques des Pays-Bas, 113(12), 573–574 (1994)).

The nomenclature of dendrimers is described in Newkome, *J. Polymer Science,* Part A; Polymer Chemistry, 31, (1993), pages 611–651.

For one type of dendrimer, poly(propylene imine), an efficient large scale synthesis has been described (de Brabander-van der Berg, E. M. M. and Meijer, E. W., Angew. Chem. Intl. Ed. Engl., 32–38, 1308 (1993)).

The repetitive reaction sequence involves a Michael addition of two equivalents of acrylonitrile to a primary amino group, followed by hydrogenation of the nitrile groups to primary amine groups. Diaminobutane (DAB) is used as the core molecule. Each complete reaction sequence results in a new "generation" with a larger diameter and twice the number of reactive functional end groups. For example, starting with diamino butane (DAB), double Michael addition of acrylonitrile yields a species with four cyano groups (DAB-dendr-$(CN)_4$). Catalytic hydrogenation with $H_2$/Raney-Co results in a molecule with four primary amine groups (DAB-dendr-$(NH_2)_4$). Repeating this sequence yields dendrimers with $2^n$ cyano or amine end groups, where n is an integer of 2 to 1000, preferably 2 to 100 and more preferably 2 to 20, thus there may be, for example, 8, 16, 32, 64 or 128 such end groups. These end groups may be further reacted or grafted with other molecules to yield the desired surface and/or internal core chemistries.

Similarly ethylene diamine (EDA) may be used instead of diaminobutane (DAB) as the core molecule.

The hyperbranched dendrimeric structure contains primary, secondary and tertiary amines (at various ratios ranging from 0 to 100%). At lower pH values, the primary, secondary and tertiary amines become protonated thereby developing a positive charge. The charges are developed by the interior as well as the surface amine groups. For example, for one type of dendrimer, poly(propylene imine), both the interior tertiary amines as well as the surface primary amines are cationically charged at pH values below 8.

For the purpose of this invention it is necessary that the dendrimeric polymer develop a positive charge at the desired operating pH, and, in particular, this positive charge may be achieved with the end groups. The groups which yield the positive charge may be any suitable groups, for example, amino groups, as for example, primary, secondary, or tertiary amines or quarternized amine functionalities.

Suitably n is chosen such that the dendrimer is readily dispersible in water, and preferably soluble in water. A particularly advantageous subclass of dendrimer has a weight average molecular weight of less than about 50,000. Especially preferred dendrimers have a positive charge of at least 1.5 meq/gram and more preferably at least about 6 meq/gram, most preferably 14 to 19 meq/gram, measured by colloid titration at a pH of 5.

A preferred class of dendrimers are poly(propylene imines) in which the core monomer is a diamino lower alkane of 2 to 10 carbon atoms, preferably 2 to 6 carbon atoms, for example, ethylene diamine (EDA) or diaminobutane (DAB), and the core monomer is reacted with acrylonitrile.

Suitably the dendrimers employed in this invention are prepared by the repetitive reaction sequence involving a Michael addition of two equivalents of acrylonitrile to a primary amine group followed by a hydrogenation of the nitrile groups to primary amines. Diaminobutane and ethylenediamine are preferred core molecules. The end groups are preferably primary amines.

By way of example the molecular weights of the dendrimers used in this invention are 300 and 7,166 Daltons for $DAB(PA)_4$ which is 4-cascade:1,4-diaminobutane-[4]:propylamine and DAB(PA)64 which is 64-cascade:1,4-diaminobutane:(1-aza-butylidene)$^{64}$ propylamine, respectively and 517 and 1430 Daltons for $EDA_4$ and $EDA_8$, respectively. The respective charge densities at pH 5 are 18.2 meq./gram net and 14.9 meq./gram net for $DAB(PA)_4$ and $DAB(PA)_{64}$, respectively and 17.0 meq./gram net and 16.4 meq./gram net for $EDA(PA)_4$ and $EDA(PA)_8$ respectively. For comparative purposes, the charges of a typical poly (DADMAC) or branched polyethyleneimine at pH 5 are approximately 5.5 meq./gram net and 5.9 mEq./gram net.

In the process of this invention, the dendrimers are preferably added to the pulp slurry or stock as an aqueous solution before the papermaking stock reaches the paper machine headbox. Ideally, the point of addition is sufficiently before the headbox to enable complete mixing of the polymer into the pulp but after all points of extreme turbulence, such as fan pumps and pressure screens. However, other points of addition may be suitable, either before or after shear locations.

Additionally, the dendrimeric polymers may be added directly to a desired point of addition, such as for example the machine headbox, blend chest, mixing chest, thick stock chests, save-all, or the dilution white water silos/supply lines. Alternatively, the dendrimeric polymers may be mixed directly with the filler slurries or other chemicals prior to their addition to the pulp slurries.

The dendrimeric polymer is added to the pulp or filler slurry in an effective amount. The amount of dendrimeric polymer added can vary depending on several factors, for example, the dendrimeric molecular weight, the dendrimeric surface charge at the operating pH, the pulp used, and the type of surface chemistry. The amount can be determined by those skilled in the art for any particular product or process. However, in general terms, the dendrimeric polymer will be added at a rate between 0.1 and 20 percent by weight based on the weight of oven dried pulp; a preferred embodiment incorporates a range of between 0.1 percent and 5 percent by weight.

The dendrimeric polymers may also be used in conjunction with other papermaking additives for different purposes including improving drainage and retention performance. These additives include various inorganic materials, such as bentonite and alum, and/or organic materials, such as various natural, modified natural, or synthetic polymers which are included in the thin or thick stock for the purpose of improving the drainage and retention process. These can be added, optionally, at locations prior to or after to the addition of the dendrimeric polymer. They may also be added at the same location or variations thereof.

MODE FOR CARRYING OUT THE INVENTION

Figure 1:
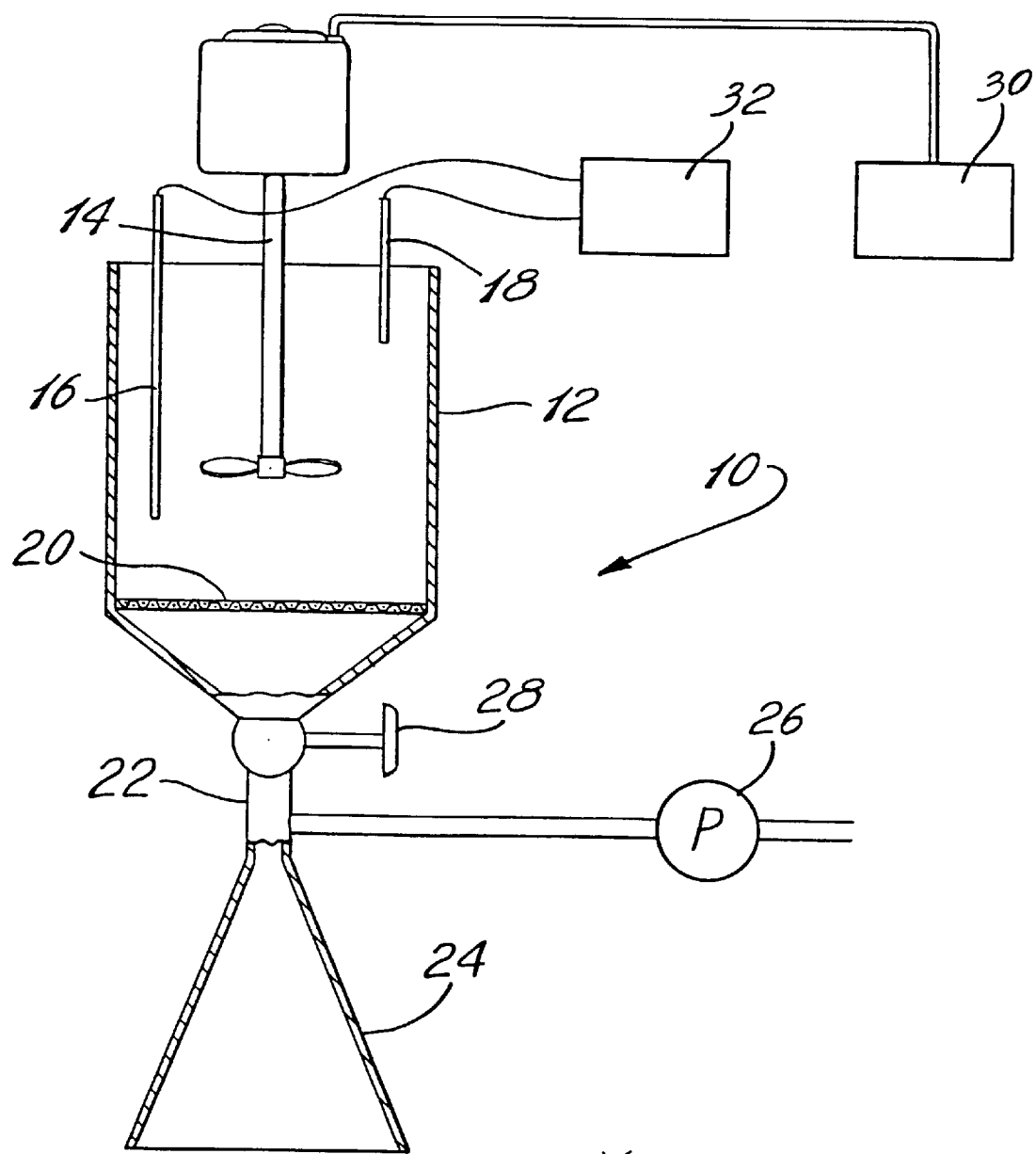
FIG. 1 illustrates schematically a modified drainage jar (MDDJ) employed in the experiments illustrating the invention.
Figure 2:
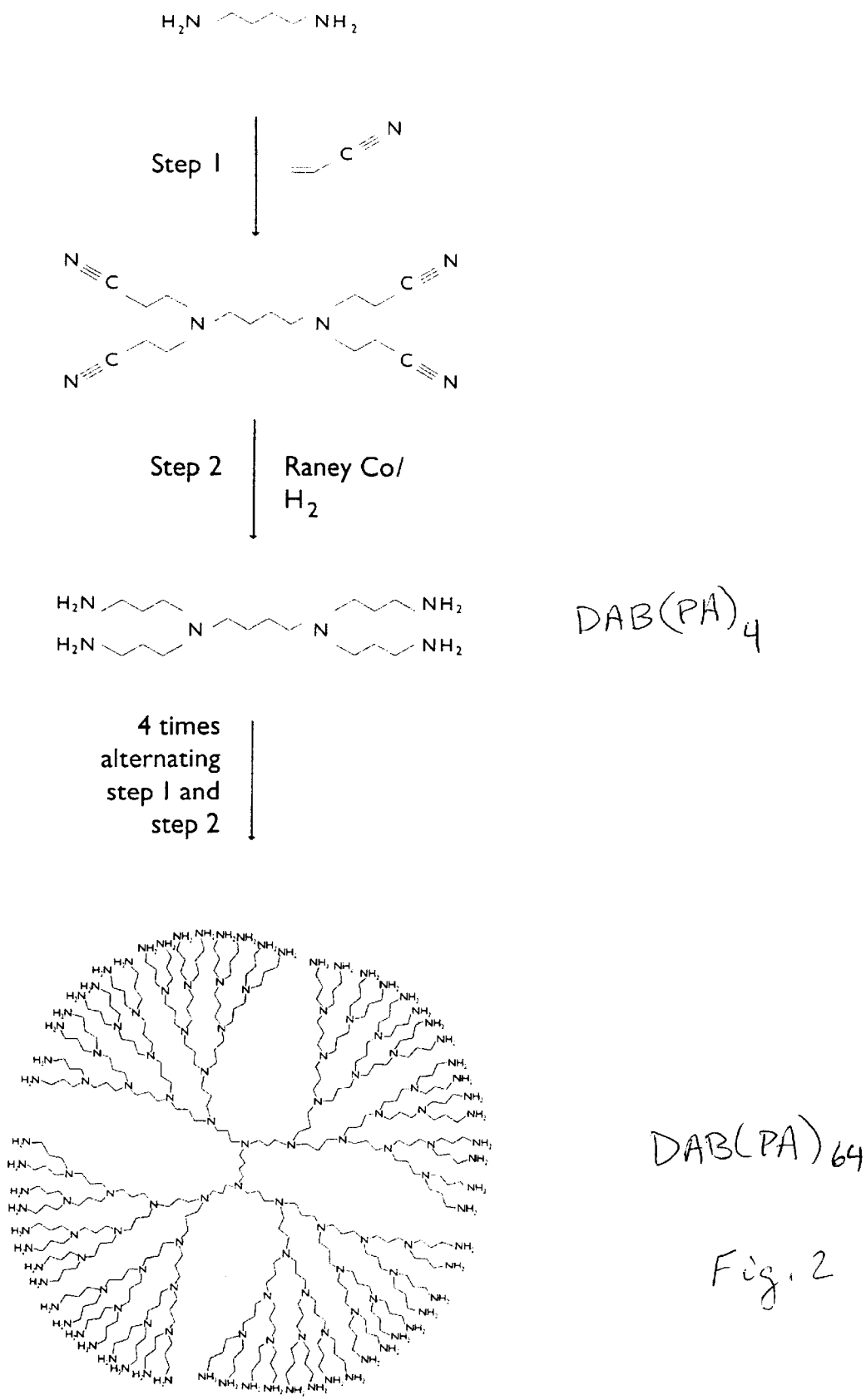
FIG. 2 illustrates a dendrimeric polymer formulation.

With further reference to FIG. 1, a modified dynamic drainage jar 10 has a drainage tank 12, a stirrer 14 and level sensing electrodes 16 and 18.

Tank 12 has a papermachine wire 20 disposed in a lower region above an outlet 22. Outlet 22 communicates with a vacuum flask 24 which is operatively connected to a vacuum pump and gauge 26. A ball valve 28 functions to open and close outlet 22.

Stirrer 14 is operatively controlled by a stirrer control 30, and electrodes 16 and 18 are operatively connected to a timer 32.

In order to disclose more clearly the nature of the present invention the following examples illustrating the invention are given:

A. i) The Approach

The performances of different dendrimer polymers, used alone or with a polyacrylamide, were measured in the laboratory in TMP newsprint pulps at three levels of system closure. In this specification the degree of system closure is defined in terms of fresh water makeup to the machine. Accordingly, the levels of system closure used were: 55, 20, and 2 m$^3$/t. Additionally the dendrimers were tested on two board stocks, a filled stone groundwood-DIP-ultra high yield sulfite newsprint furnish, a peroxide bleached TMP furnish, and a hydrosulfide bleached TMP furnish.

ii) Pulps and White Waters

Headbox pulp and wire pit white water samples were taken from two integrated TMP newsprint mills. Mill A was modem and the fresh water usage, 20 m$^3$/t, was typical of TMP newsprint mills built in the last ten years. Mill B had a fresh water usage of 55 m³/t, typical of an older facility. Retention aids were not employed in either mill. Mill A produces 100% TMP from 40% spruce and 60% fir. Mill B produces 100% TMP from 75% spruce and 25% fir.

Simulated white water for an advanced closure level was prepared in the laboratory by washing pulp collected from the secondary refiner discharge in Mill B. The apparatus for white water preparation consisted of a stock tank, screw press, white water tank and pumps (Francis D. W. and Ouchi M. D. (to be published)). It was operated in batch mode. The unwashed pulp at 30% consistency was diluted to 2% consistency with fresh water and agitated for 30 minutes at 60° C. The pulp suspension was then dewatered to approximately 44% consistency with the screw press and the pressate was recycled to dilute the next batch of pulp. This cycle was repeated for 13 more batches until the desired contaminant level was attained. A small volume of fresh water was added after batch 10 to produce the desired volume of white water. Gravity clarification was used to remove the suspended solids.

The contaminant level in the paper machine white water depends on a number of factors in addition to the fresh water usage, including the white water management strategy and the choice of dewatering equipment. Therefore, it is not possible to directly relate the contaminant level of the simulated white water to a mill closure level. The simulated white water corresponded to the white water expected in a fully integrated white water system with a process fresh water addition of about 2 m³/t.

Headbox stock was also obtained from a third newsprint mill producing newsprint using groundwood (GWD), deinked (DIP), and ultra high yield sulfite (UHYS) pulps. Clay content in the sheet is nominally 5–7%.

Two board stocks were obtained from a corrugated medium producer. The first stock was 100% old corrugated container (OCC) and the second stock was 50% OCC/50% NSSC (neutral sulfite semi-chemical). The NSSC was produced using spruce chips.

Lastly, three other newsprint furnishes were obtained:

(i) A supercalendered newsprint furnish composed of 69% peroxide bleached TMP, 6% kraft, and 25% broke with a normal clay content of 22%.

ii) A standard newsprint furnish composed of 75% hydrosulfite TMP and 25% broke with no clay.

iii) A standard newsprint furnish composed of 50% hydrosulfite bleached TMP, 25% deinked fibre and 25% broke.

iii) Polymer Preparation

The polymer solutions were prepared with twice-distilled water produced in a glass distillation apparatus. Solutions were freshly prepared every day at a concentration of 1% active ingredients. $DAB(PA)_4$ and $DAB(PA)_{64}$ were obtained as 100% and 97.5% active solutions, and the EDA polymers were obtained as 100% active solutions, based on total weight. The cationic polyacrylamide (CPAM) was prepared by mixing 1 gram of the solid polymer and adding 99 grams of twice-distilled water. The polymer solution was then diluted to 0.25% actives prior to use.

iv) Charge Densities of the Polymers by Colloid Titration

The cationic demands were determined using a modified polyelectrolyte titration technique outlined by Horn (Horn D., Progr. Coll. Poly. Sci., 65, 255–264 (1978)) at pH 5. 10 mL of a 0.01% active ingredients wt/wt polymer solution was diluted to 100 mL and titrated with PVSAK to a pink end-point.

v) Retention and Drainage Measurements

Retention and drainage measurements were done in three ways: (1) using the Dynamic Drainage Jar (DDJ), using the modified Dynamic Drainage Jar (MDDJ), and using a modified DDJ for gravity drainage measurements (FDDJ) as described in the following three sections. All measurements were done at 60° C. and at a pH of 5.2.

vi) 1) Modified Dynamic Drainage Jar (MDDJ)

First pass- retention (FPR) with mat formation (nominal basis weight 80–120 g/m²), drainage rate, and consistency after vacuum were obtained using our modified dynamic drainage jar (MDDJ) method (Yaraskavitch I. M., Allen L. H. and Heitner C., Pulp Pap. Sci., 16(3), J87–93 (1990)). All polymer concentrations are expressed as net active ingredients in the results. The modified drainage jar is illustrated in FIG. 1. The MDDJ is fitted with a nylon machine wire with an 86:60 mesh.

The headbox stocks were diluted with white water to ~0.15% consistency. To do so, the white water was previously filtered once through a Reeve Angel 202 (Trade-mark) filter paper to remove all the suspended solids. Headbox stock from mill A was diluted with filtered white water from mill A and headbox stock from mill B was diluted with filtered white water from mill B or filtered simulated white water at 2 m³/t. These were the 20 m³/t, 55 m³/t, and 2 m³/t furnishes, respectively.

With the propeller rotating at 500 rpm, air was bubbled under the screen in order to keep the sample from draining into the part of the MDDJ below the screen where it would not be properly mixed. 15 seconds after pouring the furnish into the MDDJ, the dendrimer being tested was added. At 30 seconds, the CPAM was added (if required). 50 seconds after pouring the stock into the MDDJ, the polymer being tested was added to the MDDJ. After 50 seconds, the airflow was stopped and the vacuum was applied to the vacuum flask at 20 cm Hg. At exactly one minute, the drainage valve was opened allowing the sample to drain. The level sensing electrodes measured the drainage time and when the timer had stopped, full vacuum (64 cm Hg) was applied for 40 seconds.

The mat was peeled off the screen and weighed. The sample was placed in a centrifuge tube equipped with a screen and centrifuged at 5000 RPM (4500 g) for 30 minutes using a Sorvall RC-3B (Trade-mark) centrifuge with an HG-4L rotor. The mat was reweighed, dried overnight in an oven at 105° C. and the dry weight was recorded. The response of the wet web to vacuum was evaluated by calculating the consistency of the mat after exposure to vacuum (i.e., dryness), and the water retention values (WRV) are reported as the consistency after centrifugation (Tappi Useful Method UM256; Scallan A. M. and Charles J. E., Svensk Papperstidn. 75, 699–703 (1977)).

The consistency of a 100 mL sample of the total filtrate collected during vacuum was used to calculate the first-pass retention (FPR) with mat formation. A minimum of three runs was performed for each experimental point from which an average was calculated. An additional 25 mL of filtrate were collected for turbidity measurements.

vii) Dynamic Drainage Jar (DDJ)

The Dynamic Drainage Jar (DDJ) is fully described in Pulp Paper Can., 80(12):T425 (1979). The DDJ was fitted with a 40 mesh stainless steel wire screen and a nozzle consisting of the tip of 25 mL pipette. For all experiments the stock in the DDJ was stirred at 500 RPM. 15 seconds after the stock is added into the DDJ, the dendrimer is added. If required the CPAM was added at 30 seconds. After 45 seconds the nozzle was opened allowing the white water to flow out.. The first 25 mL portion was discarded. The next 100 mL portion was collected. The consistency (solids content) of the white water was determined gravimetrically after filtration and drying of the Whatman 40 (Trade-mark) filter pad at 105° C. The first pass retention was calculated. If needed, the filter pads were washed and the ash content was determined according to TAPPI test procedure T-211.

viii) Free Dynamic Drainage Jar

Drainage measurements were carried out using a standard D.D.J. which was slightly modified to allow unrestricted drainage. The modification consisted of a 2 cm opening at the bottom of a standard D.D.J. and a further 0.5 cm opening on the side of the standard D.D.J. located below the screen. This allowed any white water flowing through the screen to be freely evacuated. The FDDJ was equipped with a 40 mesh screen and a glass funnel deposited on the top of the DDJ. The glass funnel is stoppered with a rubber plug. Essentially the experiment is carried out by adding the polymers in the same manner as they are added in the DDJ experiments: a standard DDJ is fitted with a plexiglass bottom, the polymers are added, and after 45 seconds, the stirrer is stopped. The furnish is added into the glass funnel and the rubber stopper is quickly removed. The furnish drops into the FDDJ and the time required to drain 100 mL is measured.

B. i) Pilot Machine Trial

The pilot machine had a trim of 330 mm and consisted of a twin-former, a three roll inclined press followed by an extended nip press, a forth press, and a reel for collection of pressed wet paper. The operating speed of the pilot machine was 600 m/min. The first two press nips were loaded to 45 to 90 kN/m while the third and fourth press nips were operated at 300 and 100 kN/m, respectively. The paper machine had no dryers: the wet paper samples were cut from the reel and were either used to determine the web-web properties or dried between blotters on a rotary photographic dryer for subsequent evaluation of dry paper.

The headbox opening was 0.00369 $m^2$. The fibre flux through the machine was 748 kg/hour. The targeted sheet basis weight was 45 $g/m^2$. The machine wire used was an MT Series Monoflex 2000 (Trade-mark) by JWI.

The stock ash was 11.71%. The reslushed stock consistency was 2.8%. At the beginning of the trial one ton of SCC newsprint paper was reslushed and diluted to about 1% consistency. Paper was produced on the pilot machine and subsequently discarded in order to produce white water with a steady-state consistency. The white water produced was stored in a white water tank. Following production of the white water, another ton of newsprint was reslushed and stored in the thick stock tank. Headbox stock for the pilot trial was produced by diluting the thick stock with the produced white water in the white water tank.

The reslushed peroxide bleached newsprint used to produce the pilot machine headbox stock was composed of 75% virgin fibre (80% peroxide bleached TMP, 10% hydrosulfite TMP, 9% kraft) and 25% broke. The stock produced had a freeness of 55 mL CSF, an ash content of 11.71% and a pH of 5.1. The headbox consistency for the pilot trial was approximately 0.85%.

ii) Polymers Preparation

The flocculant used was a 10% mole ratio cationic polyacrylamide. 200 liters of 0.05% flocculant solution were prepared by dispersing the polymer in water at room temperature and agitating the polymer until full dilution had been accomplished. The DAB(PA)$_4$ dendrimer retention aid was prepared by diluting, with agitation, the 100% actives liquid to a concentration of 0.5% actives. 750 liters of solution were prepared at room temperature.

The 0.5% solution of dendrimer retention aid was metered to the pulp suspension at an inlet at the fan pump to ensure good mixing. The polyacrylamide solution was metered after the fan pump. The temperature of the headbox stock was maintained at 50° C. The time for the pulp to travel from the injection points to the headbox for the polyacrylamide and dendrimer retention aid was estimated to be 5 seconds and 7 seconds, respectively. The pH was monitored at 4 minute intervals and was kept constant at 5.1 by slow addition of 10% sulfuric acid into the returning white water flow.

iii) Experimental Procedure

The pilot plant trial was run by dividing the total trial into 11 time periods. Each time period had a duration of 30 minutes. Sampling of the machine headbox and white water was done at every 4 minute interval in conjunction to pH monitoring.

Headbox and white water samples were used to measure the change of FPR, FPAR, turbidity and cationic demand as a function of polymer dosage.

EXAMPLES

Example 1

For this experiment the gravity drainage rate was measured using the FDDJ. Stocks at 2 $m^3/t$ and 55 $m^3/t$ were prepared from the headbox stock obtained from Mill B. The headbox stock was 100% TMP and contained no additives or fillers. The headbox stock were diluted to a consistency of 0.48% and 0.47% for the 55 $m^3/t$ and 2 $m^3/t$ furnishes, respectively. Dilution for the 55 $m^3/t$ stock was done using filtered machine white water. The dilution for the 2 $m^3/t$ stock was accomplished using filtered recirculated white water from our laboratory screw press. Branched modified PEI (BM-PEI) a highly charged polyethyleneimine coagulant was also tested for comparative purposes. (BM-PEI) was prepared at 1% net actives. All polymer dosages are based on net actives. The diluted furnish was heated to 60° C. and mixed at 500 R.P.M prior to each experiment. As can be seen from the data in Table I, the increased addition of both dendrimer polymers increases the drainage rate of the furnish. The effect of dendrimer addition is most pronounced in the 55 $m^3/t$ stock. A four-fold improvement in drainage was obtained with the first generation dendrimer. The improvement in drainage for the 2 $m^3/t$ was not as pronounced. In either case both dendrimer polymers outperformed BM-PEI at an equivalent net dosage.

Example 2

For this experiment the first-pass retention (FPR) was measured using the D.D.J.. Stocks at 2 $m^3/t$ and 55 $m^3/t$ were prepared from the headbox stock obtained from Mill B. The headbox stock was 100% TMP and contained no additives or fillers. The headbox stocks were diluted to consistencies of 0.52% and 0.54% for the 55 $m^3/t$ and 2 $m^3/t$ furnishes, respectively. Dilution for the 55 $m^3/t$ stock was done using filtered machine white water. The dilution for the 2 $m^3/t$ stock was accomplished using filtered recirculated white water from our laboratory screw press. BM-PEI, a highly charged polyethyleneimine coagulant was also tested for comparative purposes. BM-PEI was prepared at 1% net actives. All polymer dosages are based on net actives. The furnish was heated to 60° C. and mixed at 500 R.P.M. As can be seen from the data, the increased addition of the dendrimer polymer increases the first-pass retention of the furnish (Table II). The first-pass retention is again most improved in the 55 $m^3/t$ furnish. A gain of over 15% is noted at the highest polymer concentration. In both cases, the dendrimer polymers outperform Polymin SKA.

Example 3

For this experiment the first-pass retention (FPR), dryness, WRV, drainage rate using the electrodes (E), drainage rate using the dry spot (DS), and turbidity were measured using the modified D.D.J.. (MBDJ) Stocks at 2 m³/t and 55 m³/t were prepared from the headbox of Mill B. The headbox stock was 100% TMP and contained no additives or fillers. The headbox stocks were diluted to a consistency of 0.16% and 0.18% for the 55 m³/t and 2 m³/t furnishes, respectively. Dilution for the 55 m³/t stock was done using filtered machine white water. The dilution for the 2 m³/t stock was accomplished using filtered recirculated white water from a laboratory screw press. BM-PEI, a highly charged polyethyleneimine coagulant was also tested for comparative purposes. BM-PEI was prepared at 1% net actives. All polymer dosages are based on net actives. For these experiments CPAM was also used. The dendrimer was added to the stock prior to the addition of the CPAM. The furnish was heated to 60° C. and mixed at 500 R.P.M. As can be seen from the results in Table III ((a) and (b)), the addition of the dendrimers, with or without the further addition of CPAM, improves the measured properties: the FPR is seen to increase, the measured turbidity decreases, the drainage rates (E) and (DS) increase, and the dryness and WRV values increase. However, the results are less pronounced for 2 m³/t.

Example 4

For this experiment the first-pass retention (FPR), first-pass ash retention (FPAR), dryness, drainage rate using the electrodes (E), drainage rate using the dry spot (DS), and turbidity were measured using the modified D.J.. A stock at 20 m³/t was prepared from the headbox of Mill A. The headbox stock was 100% TMP and contained no additives. The filler content in the stock was 20%. The headbox stock was diluted to a consistency of 0.16% using filtered white water from the papermachine. BM-PEI, a highly charged polyethyleneimine coagulant was also tested for comparative purposes. BM-PEI was prepared at 1% net actives. All polymer dosages are based on net actives. The furnish was heated to 60° C. and mixed at 500 R.P.M. As seen from the results in Table IV, the use of the dendrimer polymers increases dryness, drainage rates, FPR, and FPAR. Both dendrimers outperform BM-PEI at equivalent actives dosages.

Example 5

Headbox stock was obtained from a third newsprint mill producing newsprint using a furnish composed of groundwood (GWD), deinked (DIP), and ultra high yield sulfite (UHYS) pulps. The clay content in the sheet is nominally 5–7%. The first-pass ash retention (FPAR) was measured using the DDJ. The furnish was loaded with additional clay. The final clay content was 30.5%. The clay was treated with dendrimer prior to addition to the stock. The headbox stock consistency was 0.84% after dilution with filtered white water. The Furnish was heated to 60° C. and mixed at 500 R.P.M. Results in Table V indicate that the addition of either of the dendrimers increases FPR.

Example 6

Two board stocks were obtained from a corrugated medium producer. The first stock was 100% old corrugated container (OCC) and the second stock was 50% OCC/50% NSSC (neutral sulfite semi-chemical). The NSSC was produced using spruce chips. For this experiment the first-pass retention (FPR), WRV, and drainage rate using the electrodes (E) were measured using the modified D.J.. The stock consistencies were 1.15% for the OCC and 1.20% for the 50% OCC/50% NSSC as received from the mill. These stocks were used as is and the consistency was not adjusted. The Furnish was heated to 60° C. and mixed at 500 R.P.M. Results in Table VI indicate a marked improvement in drainage rate for the 100% OCC furnish and a slight improvement in WRV and FPR. On the other hand the dendrimer only slightly improved the WRV and FPR for the 50% NSSC/50% OCC stock and was detrimental to the drainage rate.

Example 7

The same stocks as in Example 6 were used. For this experiment the gravity drainage rate was measured using the FDDJ. The stock consistencies were 1.15% for the OCC and 1.20% for the 50% OCC/50% NSSC. The Furnish was heated to 60° C. and mixed at 500 R.P.M. The drainage rate is seen in Table VII to increase substantially for the 100% OCC stock. The improvement in drainage for the 50% OCC/50% NSSC stock was only slight.

Example 8

Illustrated in this example is the effect of the dendrimers on dispersed resin particle concentration. The same headbox stock as used in example I (55 m³/t headbox stock) was used for this example. The concentration of colloidally dispersed wood resin in the D.J. was determined (Allen L. H., Trans. Tech. Sect. CPPA, 3, 32, 1977). In this procedure the resin particle concentrations were determined with a hemacytometer and microscope which was fitted with a 40× objective lens and gave an overall magnification of 800×. The results are shown in Table VIII as a function of the concentrations of the two dendrimers. At the highest polymer concentrations the dispersed resin in the white-water was reduced by 97% by the DAB(PA)$_{64}$ and 63% by the DAB(PA)$_4$. The furnish was heated to 60° C. and mixed at 500 R.P.M.

Example 9

Headbox stock was obtained from a newsprint mill producing supercalendered newsprint using a furnish composed of 69% peroxide bleached TMP, 6% Kraft and 25% broke. The clay content in the sheet was nominally 22.17%. The first-pass retention (FPR) was measured using the standard D.D.J. The headbox stock consistency was 0.89%. The furnish was heated to 50° C. and mixed at 1200 R.P.M. The dendrimer was added first followed by the addition of 500 g/ton of a 10% mole ratio cationic polyacrylamide. Results in Table IX indicate that the addition of dendrimers increases FPR.

Example 10

Headbox stock was obtained from a newsprint mill producing standard newsprint using a furnish composed of 75% hydrosulfite bleached TMP and 25% broke. The furnish contained no clay. The first-pass retention (FPR) and first pass ash retention (FPAR) were measured using the standard D.D.J. The headbox stock consistency was 0.85%. The furnish was heated to 50° C. and mixed at 1200 R.P.M. The dendrimer was added first followed by the addition of 500 g/ton of a 10% mole ratio cationic polyacrylamide. Results in Table X indicate that the addition of dendrimers increases FPR and FPAR.

Example 11

Headbox stock was obtained from a newsprint mill producing standard newsprint using a furnish composed of 50% hydrosulfite bleached TMP, 25% deinked pulp and 25% broke. The furnish contained no clay. The first-pass retention (FPR) and pitch counts were measured using the standard D.D.J.. The headbox stock consistency was 1.01%. The furnish was heated to 50° C. and mixed at 1200 R.P.M. The dendrimer was added first followed by the addition of 500 g/ton of a 10% mole ratio cationic polyacrylamide. Results in Table XI indicate that the addition of dendrimers increases FPR and decreases pitch counts.

Example 12

The results of the pilot machine trial are presented in Table XII. The procedures and polymer preparation are described in the preceding section. Results indicate that the dendrimer polymer increases FPR and FPAR while decreasing turbidity and cationic demand.

TABLE I

| Polymer | Polymer Dosage (kg/t) | Drainage Rate (mL/s) 2 m³/t | 55 m³/t |
|---|---|---|---|
| DAB(PA)$_4$ | 0 | 5.4 | 11.6 |
| | 5 | 9.3 | 17.4 |
| | 10 | 10.4 | 36.9 |
| | 15 | 10.9 | 48.1 |
| | 20 | 11.3 | 48.8 |
| DAB(PA)$_{64}$ | 0 | 5.4 | 11.6 |
| | 5 | 7.5 | 43.3 |
| | 10 | 7.7 | 39.4 |
| | 15 | 8.6 | 35.3 |
| | 20 | 9.2 | 35.0 |

TABLE I-continued

| Polymer | Polymer Dosage (kg/t) | Drainage Rate (mL/s) 2 m³/t | 55 m³/t |
|---|---|---|---|
| BM-PEI | 0 | 5.4 | 11.6 |
| | 5 | 5.7 | 14.8 |
| | 10 | 6.6 | 15.7 |
| | 15 | 7.4 | 16.9 |
| | 20 | 8.0 | 21.6 |

TABLE II

| Polymer | Polymer Dosage (kg/t) | FPR (%) 2 m³/t | 55 m³/t |
|---|---|---|---|
| DAB(PA)$_4$ | 0 | 53.2 | 61.2 |
| | 5 | 52.2 | 64.6 |
| | 10 | 53.5 | 74.5 |
| | 15 | 53.9 | 75.6 |
| | 20 | 54.1 | 77.2 |
| DAB(PA)$_{64}$ | 0 | 53.2 | 61.2 |
| | 5 | 53.1 | 69.2 |
| | 10 | 53.8 | 72.0 |
| | 15 | 57.2 | 77.2 |
| | 20 | 58.4 | 80.2 |
| BM-PEI | 0 | 53.2 | 61.2 |
| | 5 | 53.0 | 61.6 |
| | 10 | 53.8 | 63.0 |
| | 15 | 53.5 | 68.0 |
| | 20 | 53.3 | 72.8 |

TABLE III(a)

MODIFIED DYNAMIC DRAINAGE JAR
(closure: 2 cubic meters/tonne)

| Polymer | Polymer Dosage (kg/t) | Turbidity (NTU) | Dryness (%) | WRV (%) | Drainage Rate (E) (mL/s) | Drainage Rate(DS) (mL/s) | First-Pass Retention (%) |
|---|---|---|---|---|---|---|---|
| DAB(PA)$_{64}$ | 0 | 427 | 21.3 | 41.8 | 10.8 | 10.1 | 81.0 |
| | 5 | 424 | 24.9 | 42.2 | 9.3 | 8.9 | 82.8 |
| | 10 | 422 | 24.2 | 43.9 | 8.6 | 7.4 | 81.5 |
| | 15 | 416 | 23.9 | 43.5 | 8.0 | 6.3 | 77.8 |
| | 20 | 355 | 20.9 | 42.6 | 6.5 | 4.9 | 78.3 |
| DAB(PA)$_4$ | 0 | 427 | 21.3 | 41.8 | 10.8 | 10.1 | 81.0 |
| | 5 | 404 | 21.4 | 42.3 | 11.7 | 11.2 | 81.1 |
| | 10 | 382 | 22.9 | 43.0 | 11.8 | 11.4 | 81.6 |
| | 15 | 316 | 24.4 | 43.6 | 13.7 | 13.8 | 82.0 |
| | 20 | 218 | 25.3 | 44.2 | 23.9 | 21.2 | 82.8 |
| BM-PEI | 0 | 427 | 21.3 | 41.8 | 10.8 | 10.1 | 81.0 |
| | 5 | 422 | 23.3 | 41.6 | 11.5 | 14.6 | 81.8 |
| | 10 | 69 | 23.5 | 43.0 | 10.0 | 12.9 | 81.4 |
| | 15 | 365 | 24.3 | 43.3 | 10.3 | 11.9 | 82.1 |
| | 20 | 282 | 24.3 | 43.6 | 10.8 | 10.0 | 82.3 |
| DAB(PA)$_{64}$/ CPAM | 0/0 | 482 | 21.3 | 43.8 | 10.8 | 10.1 | 81.0 |
| | 0/2 | 460 | 23.6 | 43.1 | 12.5 | 10.2 | 84.2 |
| | 5/2 | 440 | 22.3 | 43.1 | 9.5 | 10.2 | 84.9 |
| | 10/2 | 418 | 22.4 | 43.0 | 10.8 | 10.5 | 86.3 |
| | 15/2 | 355 | 22.5 | 43.0 | 13.2 | 12.0 | 86.5 |
| | 20/2 | 308 | 23.2 | 43.2 | 14.0 | 14.1 | 86.8 |
| DAB(PA)$_4$/ CPAM | 0/0 | 482 | 21.3 | 43.8 | 10.8 | 10.1 | 81.0 |
| | 0/2 | 460 | 22.6 | 43.1 | 12.5 | 10.2 | 84.2 |
| | 5/2 | 389 | 23.0 | 43.5 | 12.5 | 10.2 | 83.2 |
| | 10/2 | 309 | 23.4 | 44.1 | 11.8 | 10.2 | 82.5 |
| | 15/2 | 236 | 24.4 | 44.8 | 9.7 | 10.7 | 82.4 |
| | 20/2 | 172 | 25.8 | 45.2 | 7.7 | 12.8 | 82.2 |

TABLE III(b)

MODIFIED DYNAMIC DRAINAGE JAR
(closure: 55 cubic meters/tonne)

| Polymer | Polymer Dosage (kg/t) | Turbidity (NTU) | Dryness (%) | WRV (%) | Drainage Rate (E) (mL/s) | Drainage Rate(DS) (mL/s) | First-Pass Retention (%) |
|---|---|---|---|---|---|---|---|
| DAB(PA)$_{64}$ | 0 | 195 | 15.2 | 40.8 | 29.4 | 23.9 | 77.4 |
| | 5 | 191 | 20.0 | 41.7 | 31.8 | 24.4 | 77.5 |
| | 10 | 144 | 23.2 | 43.0 | 32.6 | 25.0 | 78.9 |
| | 15 | 112 | 23.9 | 43.1 | 33.4 | 25.7 | 80.4 |
| | 0 | 111 | 27.6 | 43.7 | 33.5 | 26.1 | 81.9 |
| DAB(PA)$_4$ | 0 | 191 | 15.2 | 40.8 | 29.4 | 23.9 | 77.4 |
| | 5 | 119 | 21.8 | 42.2 | 33.3 | 27.5 | 78.3 |
| | 10 | 47 | 23.3 | 45.1 | 36.6 | 28.8 | 82.0 |
| | 15 | 29 | 24.5 | 45.4 | 38.4 | 32.3 | 83.3 |
| | 20 | 28 | 26.1 | 45.5 | 42.2 | 32.6 | 84.7 |
| BM-PEI | 0 | 195 | 15.2 | 40.8 | 29.6 | 24.0 | 77.4 |
| | 5 | 190 | 21.3 | 39.2 | 25.3 | 19.1 | 84.0 |
| | 10 | 180 | 21.5 | 38.6 | 25.4 | 17.8 | 85.6 |
| | 15 | 176 | 22.1 | 38.8 | 25.4 | 17.6 | 85.5 |
| | 20 | 174 | 22.1 | 38.8 | 25.5 | 16.9 | 86.3 |
| DAB(PA)$_{64}$/ CPAM | 0/0 | 250 | 21.0 | 40.2 | 35.2 | 26.6 | 82.4 |
| | 0/2 | 148 | 21.8 | 40.3 | 21.5 | 19.1 | 83.6 |
| | 5/2 | 143 | 23.1 | 43.9 | 12.4 | 10.7 | 87.0 |
| | 10/2 | 136 | 22.8 | 43.6 | 18.2 | 15.8 | 86.7 |
| | 15/2 | 134 | 21.4 | 42.2 | 19.8 | 18.9 | 86.0 |
| | 20/2 | 126 | 21.3 | 41.5 | 22.0 | 21.3 | 86.9 |
| DAB(PA)$_4$/ CPAM | 0/0 | 250 | 21.0 | 40.2 | 35.2 | 26.6 | 82.4 |
| | 0/2 | 148 | 1.8 | 40.3 | 21.5 | 19.1 | 83.6 |
| | 5/2 | 123 | 22.2 | 40.3 | 23.6 | 21.3 | 84.0 |
| | 10/2 | 93 | 22.4 | 40.0 | 28.1 | 26.9 | 85.0 |
| | 15/2 | 79 | 22.8 | 40.0 | 28.8 | 27.5 | 86.0 |
| | 20/2 | 62 | 23.2 | 40.0 | 29.6 | 28.6 | 86.8 |

TABLE IV

| Polymer | Polymer Dosage (kg/t) | Dryness (%) | Drainage Rate (E) (mL/s) | Drainage Rate (DS) (mL/s) | First-pass Ash Retention (%) | First-pass Retention (%) |
|---|---|---|---|---|---|---|
| DAB(PA)$_4$ | 0 | 21.9 | 11 | 12 | 38.1 | 72.8 |
| | 1.13 | 21.4 | 9.59 | 10.2 | 75.5 | 79.8 |
| | 2.26 | 21.2 | 8.34 | 8.98 | 76.7 | 77.9 |
| | 3.39 | 23.6 | 8.29 | 8.77 | 78.0 | 75.8 |
| | 4.51 | 20.5 | 8.17 | 8.66 | 79.1 | 73.7 |
| DAB(PA)$_{64}$ | 0 | 21.9 | 11.0 | 12.0 | 38.1 | 72.8 |
| | 1.02 | 25.1 | 11.0 | 13.5 | 74.8 | 84.8 |
| | 2.05 | 25.2 | 10.8 | 11.7 | 73.1 | 79.7 |
| | 3.07 | 26.4 | 10.9 | 11.7 | 74.6 | 75.9 |
| | 4.09 | 27.7 | 10.9 | 12.1 | 74.9 | 72.3 |
| BM-PEI | 0 | 21.9 | 11.0 | 12.0 | 38.1 | 72.8 |
| | 1.09 | 22.4 | 12.5 | 13.7 | 46.1 | 77.7 |
| | 2.17 | 21.4 | 11.7 | 13.5 | 53.8 | 78.2 |
| | 3.26 | 22.4 | 10.9 | 13.3 | 59.4 | 75.3 |
| | 4.34 | 20.1 | 10.4 | 13.4 | 61.9 | 72.4 |

TABLE V

| Polymer | Polymer Dosage (kg/t) | FPAR (%) |
|---|---|---|
| DAB(PA)$_4$ | 0 | 6 |
| | 5 | 14.6 |
| | 10 | 16.5 |
| | 15 | 17.8 |
| | 20 | 17.7 |
| DAB(PA)$_{64}$ | 0 | 6 |
| | 5 | 14.2 |
| | 10 | 18.5 |
| | 15 | 18.1 |
| | 20 | 23.1 |

TABLE VI

| Stock | DAB(PA)$_{64}$ Polymer Dosage (kg/t) | WRV (%) | Drainage Rate (E) (mL/s) | First-pass Retention (%) |
|---|---|---|---|---|
| 100% OCC | 0 | 2.08 | 88.7 | 94.5 |
| | 0.5 | 2.11 | 127 | 95.4 |
| | 1 | 2.11 | 124 | 95.7 |
| | 2 | 2.14 | 122 | 100.0 |
| | 4 | 2.17 | 106 | 96.8 |
| | 8 | 2.19 | 102 | 97.8 |
| 50% OCC/ 50% NSSC | 0 | 2.08 | 88.6 | 94.5 |
| | 0.5 | 2.13 | 86.2 | 99.3 |
| | 1 | 2.31 | 78.5 | 99.1 |
| | 2 | 2.21 | 72.1 | 99.2 |
| | 4 | 2.14 | 58.3 | 99.5 |
| | 8 | 2.13 | 52.4 | 99.6 |

TABLE VII

| Stock | DAB(PA)$_{64}$ Polymer Dosage (kg/t) | Drainage Rate (mL/s) |
|---|---|---|
| 100% OCC | 0 | 8.9 |
|  | 0.5 | 16.9 |
|  | 1 | 18.6 |
|  | 2 | 19.7 |
|  | 4 | 29.9 |
|  | 8 | 33.2 |
| 50% OCC/ 50% NSSC | 0 | 2.3 |
|  | 0.5 | 2.8 |
|  | 1 | 2.8 |
|  | 2 | 2.8 |
|  | 4 | 3.5 |
|  | 8 | 3.6 |

TABLE VIII

| Polymer | Polymer Dosage (kg/t) | Particle Count (millions/ml) | Percent Reduction (%) |
|---|---|---|---|
| DAB(PA)$_{64}$ | 0 | 149 | — |
|  | 5 | 137 | 8.05 |
|  | 10 | 123 | 17.44 |
|  | 15 | 82 | 44.97 |
|  | 20 | 54 | 63.76 |
| DAB(PA)$_4$ | 0 | 116 | — |
|  | 5 | 63 | 45.69 |
|  | 10 | 27 | 76.73 |
|  | 15 | 6.2 | 94.66 |
|  | 20 | 3.5 | 96.98 |

TABLE IX

| Polymer | Polymer Dosage (kg/t) | FPR (%) |
|---|---|---|
| DAB(PA)$_4$ | 0 | 44.34 |
|  | 2 | 46.89 |
|  | 4 | 47.55 |
|  | 8 | 47.65 |
| DAB(PA)$_{64}$ | 0 | 44.34 |
|  | 2 | 50.12 |
|  | 4 | 51.41 |
|  | 8 | 50.18 |
| EDA(PA)$_4$ | 0 | 44.34 |
|  | 2 | 47.82 |
|  | 4 | 47.12 |
|  | 8 | 47.43 |
| EDA(PA)$_8$ | 0 | 44.34 |
|  | 2 | 46.75 |
|  | 4 | 47.25 |
|  | 8 | 47.21 |
| Linear polyethylene imine | 0 | 44.34 |
|  | 2 | 48.95 |
|  | 4 | 48.76 |
|  | 8 | 50.31 |

TABLE X

| Polymer | Polymer Dosage (kg/t) | FPR (%) | FPAR (%) |
|---|---|---|---|
| DAB(PA)$_4$ | 0 | 32.4 | 30.5 |
|  | 2 | 34.7 | 30.6 |
|  | 4 | 34.9 | 30.3 |
|  | 8 | 35.3 | 30.1 |
| DAB(PA)$_{64}$ | 0 | 32.4 | 30.5 |
|  | 2 | 35.9 | 30.2 |
|  | 4 | 35.7 | 30.3 |
|  | 8 | 39.7 | 30.6 |
| EDA(PA)$_4$ | 0 | 32.4 | 30.5 |
|  | 2 | 36.4 | 30.5 |
|  | 4 | 37.8 | 30.4 |
|  | 8 | 37.8 | 30.3 |
| EDA(PA)$_8$ | 0 | 32.4 | 30.5 |
|  | 2 | 36.1 | 30.7 |
|  | 4 | 36.8 | 30.3 |
|  | 8 | 39.7 | 29.8 |
| Linear polyethylene imine | 0 | 32.4 | 30.5 |
|  | 2 | 34.7 | 30.3 |
|  | 4 | 36.0 | 30.3 |
|  | 8 | 38.8 | 30.4 |

TABLE XI

| Polymer | Polymer Dosage (kg/t) | FPR (%) | Pitch Particles (millions/ml) |
|---|---|---|---|
| DAB(PA)$_4$ | 0 | 27.5 | 227 |
|  | 2 | 29.0 | 153 |
|  | 4 | 30.5 | 109 |
|  | 8 | 30.4 | 93 |
| DAB(PA)$_{64}$ | 0 | 27.5 | 227 |
|  | 2 | 31.6 | 116 |
|  | 4 | 30.5 | 54 |
|  | 8 | 30.8 | 23 |
| EDA(PA)$_4$ | 0 | 27.5 | 227 |
|  | 2 | 33.0 | 131 |
|  | 4 | 34.1 | 82 |
|  | 8 | 33.2 | 73 |
| EDA(PA)$_8$ | 0 | 27.5 | 227 |
|  | 2 | 30.9 | 169 |
|  | 4 | 29.2 | 158 |
|  | 8 | 29.8 | 116 |
| Linear Polyethylene imine | 0 | 27.5 | 227 |
|  | 2 | 32.1 | 81 |
|  | 4 | 33.1 | 30 |
|  | 8 | 33.2 | 12 |

TABLE XII

| Time Period | Polymer Dosage (kg/t) DAB(PA)$_4$ | Polymer Dosage (kg/t) CPAM | FPR (%) | FPAR (%) | Turbidity | Cationic Demand (mEq./L) |
|---|---|---|---|---|---|---|
| 1 | 0 | 0 | 64.8 | 0.5 | 132 | 1.28 |
| 2 | 0 | 0.05 | 73.2 | 5.5 | 80 | 0.84 |
| 3 | 0 | 0 | 65.0 | 2.7 | 70 | 0.78 |
| 4 | 0.5 | 0 | 70.9 | 23.8 | 4 | 0.67 |
| 5 | 1.0 | 0 | 73.8 | 18.7 | 2 | 0.62 |
| 6 | 2.0 | 0 | 76.2 | 20.4 | 1 | 0.41 |
| 7 | 0 | 0 | 64.8 | 2.8 | 1 | 0.38 |
| 8 | 1.0 | 0 | 73.1 | 25.6 | 1 | 0.22 |
| 9 | 0 | 0 | 66.4 | 10.1 | 1 | 0.12 |
| 10 | 1.0 | 0.05 | 78.2 | 33.8 | 1 | 0.14 |
| 11 | 0 | 0 | 78.6 | 32.4 | 1 | 0.04 |

We claim:

1. A method of enhancing retention of components of a papermaking stock in a cellulosic sheet formed from said stock in papermaking, said stock comprising an aqueous paper-forming cellulosic dispersion of papermaking fibers and papermaking additives in an aqueous vehicle, comprising a step of including in said dispersion a dendrimeric polymer capable of developing a positive charge at an operating pH of papermaking, in an amount to enhance retention of said components in the cellulosic sheet, said dendrimeric polymer being a highly branched macromolecule of three dimensional configuration having $2^n$ functional end groups, where n is an integer of 2 to 1000, said macromolecule emanating from a central core and being synthesized through a stepwise, repetitive reaction sequence, in which each repetitive reaction sequence results in a molecule of larger diameter and twice the number of reactive functional end groups wherein said positive charge is at least 1.5 meq/gram, measured by colloid titration at a pH of 5, and said dendrimer has a molecular weight of less than about 50,000.

2. A method according to claim 1, wherein said dispersion contains colloidal particles derived from said cellulosic fibers and said additives, which colloidal particles normally exhibit poor retention in the formed cellulosic sheet in papermaking.

3. A method according to claim 1, wherein said dendrimeric polymer has amine end groups.

4. A method according to claim 1, wherein said dendrimeric polymer has $2^n$ amino functional end groups in which n is an integer of 2 to 20.

5. A method according to claim 4, wherein said dendrimer polymer is derived from diamino(lower)alkane core subjected to a repetitive reaction sequence comprising a Michael addition of two equivalents of acrylonitrile per primary amine group followed by hydrogenation of nitrile groups to primary amine groups, in which said (lower)alkane has 2 to 10 carbon atoms.

6. A method according to claim 1, wherein said dendrimeric is selected from the group consisting of diaminobutane(polyamine)$_4$, diaminobutane(polyamine)$_{64}$, ethylenediamine(polyamine)$_4$ and ethylenediamine(polyamine)$_8$.

7. A method according to claim 1, wherein said positive charge is at least 6 meq/gram, measured by colloid titration at a pH of 5, and said dendrimer polymer is present in an amount of 0.1 to 20 percent, by weight, based on the oven dry weight of said cellulosic fibers.

8. A method according to claim 1, wherein said positive charge is at least about 6 meq/gram measured by colloid titration at a pH of 5.

9. A method of enhancing retention of components of a papermaking stock in a cellulosic sheet formed from said stock in papermaking, said stock comprising an aqueous paper-forming cellulosic dispersion of papermaking fibers and papermaking additives in an aqueous vehicle, comprising a step of including in said dispersion a dendrimeric polymer capable of developing a positive charge at an operating pH of papermaking, in an amount to enhance retention of said components in the cellulosic sheet, said dendrimeric polymer being a highly branched macromolecule of three dimensional configuration having $2^n$ functional end groups, where n is an integer of 2 to 1000, said macromolecule emanating from a central core and being synthesized through a stepwise, repetitive reaction sequence, in which each repetitive reaction sequence results in a molecule of larger diameter and twice the number of reactive functional end groups wherein said dendrimeric polymer is present in an amount of 0.1 to 20 percent, by weight, based on the oven dry weight of said cellulosic fibers.

10. A method according to claim 9, wherein said amount is between 0.1 and 5 percent, by weight.

11. A method according to claim 9, wherein said dispersion contains colloidal particles derived from said cellulosic fibers and said additives, which colloidal particle normally exhibit poor retention in the formed cellulosic sheet in papermaking.

12. A method according to claim 9, wherein said dendrimeric polymer has amine end groups.

13. A method according to claim 9, wherein said dendrimeric polymer has $2^n$ amino functional end groups in which n is an integer of 2 to 20.

14. A method according to claim 9, wherein said dendrimeric is selected from the group consisting of diaminobutane(polyamine)$_4$, diaminobutane(polyamine)$_{64}$, ethylenediamine(polyamine)$_4$ and ethylenediamine(polyamine)$_8$.

15. A method according to claim 9, wherein said dendrimeric polymer is derived from diamino(lower)alkane core subjected to a repetitive reaction sequence comprising a Michael addition of two equivalents of acrylonitrile per amine group followed by hydrogenation of nitrile groups to primary amine groups, in which said (lower)alkane has 2 to 20 carbon atoms.

16. A method according to claim 9, wherein positive charge is 14 to 19 meq/gram measured by colloid titration at a pH of 5.

17. A method of producing paper comprising:
    forming a cellulosic sheet from a papermaking stock comprising an aqueous paper-forming cellulosic dispersion of papermaking components comprising papermaking fibers and papermaking additives in an aqueous vehicle,
    said dispersion comprising a dendrimeric polymer capable of developing a positive charge in said dispersiion, in an amount to enhance retention of said papermaking components in the cellulosic sheet,
    recovering a cellulosic sheet from said stock having an enhanced content of said papermaking components as compared with a cellulosic sheet formed from corresponding aqueous paper-forming cellulosic dispersion of papermaking components free of said dendrimeric polymer, and
    recovering an aqueous fraction of said stock having a diminished contents of said papermaking components, said dendrimeric polymer being a highly branched macromolecule of three dimensional configuration having $2^n$ functional end groups, where n is an integer of 2 to 1000, said macromolecule emanating from a central core and being synthesized through a stepwise, repetitive reaction squence, in which each repetitive reaction sequence results in a molecule of larger diameter and twice the number of reactive functional end groups, wherein said positive charge is at least 1.5 meq/gram, measured by colloid titration at a pH of 5, and said dendrimer has a molecular weight of less than about 50,000.

18. A method according to claim 17, carried out in a closed system in which the aqueous fraction separated from said paper-forming components during the forming of said cellulosic sheet is recycled as aqueous vehicle for fresh paper stock.

19. A method according to claim 17, wherein said dendrimeric polymer is a poly(propyleneimine) having $2^n$ amine end groups, wherein n is an integer of 2 to 20 and said dendrimeric polymer is included in an amount of 0.1 to 20 percent, by weight, based on the oven dry weight of said cellulosic fibers.

20. A method according to claim 17, wherein said dendrimeric polymer is derived from a diamino(lower)alkane core having 2 to 10 carbon atoms, subjected to a repetitive reaction sequence comprising a Michael addition of two equivalents of acrylonitrile per primary amine group followed by hydrogenation of nitrile groups to primary amine groups.

21. A method according to claim 17, wherein said dendrimer is selected from the group consisting of diaminobutane(polyamine)$_4$, diaminobutane(polyamine)$_{64}$, ethylenediamine(polyamine)$_4$ and ethylenediamine (polyamine)$_8$.

22. A method according to claim 17, wherein said dendrimeric polymer has amine end groups and said positive charge is 14 to 19 meq/gram, measured by colloid titration at a pH of 5.

23. A method according to claim 22, wherein said amount is between 0.1 percent and 5 percent, by weight.

24. A papermaking stock comprising:

an aqueous paper-forming cellulosic dispersion of papermaking components comprising cellulosic papermaking fibers and papermaking additives in an aqueous vehicle, characterized in that said dispersion contains a dendrimeric polymeric as an agent to enhance retention of said components in a cellulosic sheet formed from said dispersion in paprmaking, and in an amount of 0.1 to 20 percent, by weight, based on the oven dry weight of said cellulosic fibers, to effect such enhanced retention and provide a cellulosic sheet having an enhanced content of papermaking components as compared with a cellulosic sheet from a corresponding aqueous paper-forming cellulosic dispersion of papermaking components free of said dendrimeric polymer, said dendrimeric polymer being capable of developing a positive charge at an operating pH of papermaking of at least 1.5 meq/gram, measured by colloid titration at a pH of 5, and having a molecular weight of less than about 50,000, said dendrimeric polymer being a highly branched macromolecule of three dimensional configuration having $2^n$ functional end groups, where n is an integer of 2 to 1000, said macromolecule emanating from a central core and being synthesized through a stepwise, repetitive reaction sequence, in which each repetitive reaction sequence results in a molecule of larger diameter and twice the number of reactive functional end groups.

25. A stock according to claim 24, wherein said dispersion contains colloidal particles derived from said cellulosic fibers and said additives, which colloidal particles normally exhibit poor retention in the formed cellulosic sheet in papermaking; and said dendrimeric polymer being a poly (propyleneimine) having amine end groups, said positive charge being at at about 6 meq/gram measured by colloid titration at a pH of 5.

26. A stock according to claim 24, wherein said amount is between 0.1 percent and 5 percent by weight.

27. A stock according to claim 24, wherein said dendrimeric polymer has amine end groups and said positive charge is 14 to 19 meq/gram, measured by colloid titration at a pH of 5.

28. A cellulosic paper sheet derived from an aqueous paper-forming cellulosic dispersion of papermaking components, and a dendrimeric polymer in an amount of 0.1 to 20 percent, by weight, based on the oven dry weight of said cellulosic fibres and being capable of developing a positive charge at an operating pH of papermaking of at least 1.5 meq/gram, measured by colloid titration at a pH of 5, and having a molecular weight of less than about 50,000, said paper sheet containing said dendrimeric polymer and having an elevated content of the papermaking components of the dispersion, as compared with a paper sheet derived from a corresponding dispersion free of said dendrimeric polymer, said dendrimeric polymer being a highly branched macromolecule of three dimensional configuration having $2^n$ functional end groups, where n is an integer of 2 to 1000, said macromolecule emanating from a central core and being synthesized through a stepwise, repetitive reaction sequence, in which each repetitive reaction sequence results in a molecule of larger diameter and twice the number of reactive functional end groups.

29. A paper sheet according to claim 28, wherein said amount is between 0.1 percent and 5 percent, by weight.

30. A paper sheet according to claim 29, wherein said dendrimeric polymer has amine end groups and said positive charge is 14 to 19 meq/gram, measured by colloid titration at a pH of 5.

* * * * *